United States Patent [19]

Freeman

[11] Patent Number: 5,523,993
[45] Date of Patent: Jun. 4, 1996

[54] HOLOGRAPHIC OPTICAL ELEMENT FOR OPTICAL DISK PICKUP HEAD

[75] Inventor: Mark O. Freeman, Hsinchu, Taiwan

[73] Assignee: Opto-Electronics & Systems Laboratories, Chutung Hsinchu, Taiwan

[21] Appl. No.: 443,246

[22] Filed: May 17, 1995

[51] Int. Cl.⁶ ........................................... G11B 7/00
[52] U.S. Cl. .................... 369/109; 369/103; 369/105; 369/116; 369/44.25; 250/201.5
[58] Field of Search ........................ 369/109, 105, 369/103, 116, 44.11, 44.41, 44.25; 250/201.5

[56] References Cited

U.S. PATENT DOCUMENTS

| | | | |
|---|---|---|---|
| 4,686,663 | 8/1987 | Kühn | 369/109 |
| 4,945,529 | 7/1990 | Ono et al. | 369/109 |
| 4,983,017 | 1/1991 | Tsuji et al. | 369/109 |
| 5,157,249 | 10/1992 | Hashimoto et al. | 250/201.5 |
| 5,361,246 | 11/1994 | Tominaga | 369/44.25 |
| 5,410,529 | 4/1995 | Kurata et al. | 369/109 |
| 5,412,631 | 5/1995 | Komma et al. | 369/109 |

*Primary Examiner*—Loha Ben
*Attorney, Agent, or Firm*—Barnes, Kisselle, Raisch, Choate, Whittemore & Hulbert

[57] ABSTRACT

A pickup head for use in optical disk systems such as compact disk players or CD-ROM computer memory includes a holographic optical element that has two decision regions that greatly simplify the design of the pickup head. The two decision regions diffract light that encounters the holographic optical element in two different directions, respectively. The amount of light power incident upon each decision region is utilized to determine a focus error signal and to interpret information stored on the compact or optical disk.

20 Claims, 5 Drawing Sheets

HOLOGRAPHIC OPTICAL ELEMENT FOR OPTICAL DISK PICKUP HEAD

BACKGROUND OF THE INVENTION

1. Field of the Invention

This invention relates generally to optical data storage and retrieval for computer applications. More specifically, this invention relates to a pickup head that includes a holographic optical element for use in computer systems including optical disk storage.

2. Description of the Prior Art

The use and demand for compact disk devices is currently growing. Compact disk devices are found in more consumer-oriented products such as home entertainment systems, multi-media systems and CD-ROM for computer memories and other sophisticated computer devices. Optical disk memories are also emerging as an important and reliable form of information storage for computer systems generally. The optical pickup head is a key component within such devices.

An optical pickup head is typically comprised of a laser diode that is used to transmit light in a manner that allows the information from the optical disk to be retrieved. Optical pickup heads typically include a lens and a small optical system that collect and process light that originates from a laser diode and is reflected from the disk surface. Typically, a set of photodetectors that convert reflected light into electronic signals are used in order to gather the information that is stored on the optical disk. Photodetectors are also typically used to insure that the light emitted from the laser diode is focused and tracking properly.

Several conventional systems include holographic optical elements. The holographic optical elements are typically used to direct light reflected from the disk onto a set of photodetectors. In such systems, the orientation and geometry of this system, specifically the arrangement of the holographic optical element relative to the photodetectors, is crucial. A specific interaction between the holographic optical element and the photodetector elements is critical to the performance of the pickup head because of the photodetectors are used to determine proper focus and tracking. If a specific and highly specialized orientation is not maintained between a holographic optical element and the photodetectors, there is a possibility for inaccurate processing of information from the optical disk.

The geometric or alignment requirements in such systems has several drawbacks. First, stringent specifications and requirements are imposed when manufacturing such systems. Such specifications make such pickup heads difficult and relatively expensive to manufacture. Further, minor, relatively undetectable changes in a specific alignment can occur over time, which may reduce the integrity of the system. This introduces potential further cost with the need for replacement of parts or repair of the pickup head system.

Therefore, it is an object of this invention to provide a pickup head design that reduces the alignment and specific geometric tolerance requirements of individual components within the pickup head without sacrificing the performance of the pickup head. A pickup head designed in conformance with this invention provides improved economies in manufacturing by reducing the complexities associated with assembly and reducing the number of parts included in the system.

SUMMARY OF THE INVENTION

In general terms, this invention is a pickup head for processing information that is stored on a reflective storage medium, such as an optical disk. The pickup head includes a laser for irradiating the storage medium such that radiation originating from the laser reflects from the medium. A holographic element is disposed generally in a pathway of the reflected radiation. The holographic element has two regions for diffracting the reflected radiation in two different directions. The two diffracting regions are positioned on the holographic element such that each region receives an equal amount of reflected radiation under preselected conditions. A photodetector is positioned to receive the diffracted radiation and determines an amount of radiation incident on each respective diffracting region. The comparison of the respective amounts of incident radiation facilitates determining whether the pickup head laser is properly focused and tracking.

DETAILED DESCRIPTION OF THE PREFERRED EMBODIMENTS

Figure 1:
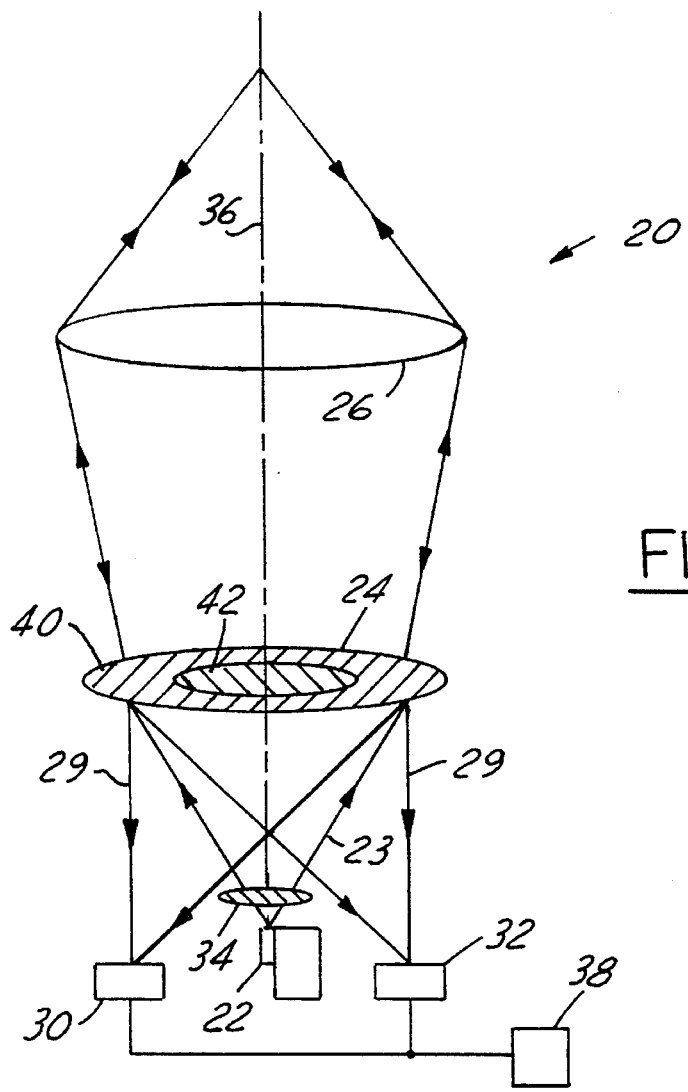
FIG. 1 is a schematic, diagrammatic representation of an optical pickup head designed in accordance with this invention.

FIG. 1 illustrates a pickup head 20, showing selected components by schematic representation. Pickup head 20 includes laser diode 22 that is used to emit light for retrieving information that is stored on an optical disk. The light that is emitted from laser diode 22 travels in a forward direction away from laser diode 22, which corresponds to a generally upward direction according to the drawing. Light proceeding in the forward direction is typified at 23 in the illustration. A holographic optical element 24 is placed between laser diode 22 and lens 26. Lens 26 is utilized to diffract light as it proceeds toward optical disk 28. Light is then reflected from the optical disk 28 and proceeds in a reverse direction, which corresponds to proceeding generally downward according to the drawing, or away from optical disk 28. The reflected light is typified at 29 in the illustration.

A photodetector array 30 is provided near laser diode 22. Photodetector array 30 gathers information from the reflected light 29. In the illustrated embodiment, an optional or supplemental photodetector array 32 is provided. It is to be understood that a single photodetector array or a pair of photodetector arrays can be utilized in accordance with this invention. When a pair of photodetector arrays is used, the geometry of the multiple photodetector elements in one array is a symmetric reflection of the geometry of the multiple photodetector elements in the other array. This symmetry is determined relative to a center point that corresponds to the laser diode light emission point. In this manner, the two detector arrays receive light from plus and minus diffraction of the same order from the holographic optical element. A symmetric pair of arrays is illustrated in FIG. 1.

Figure 3A:
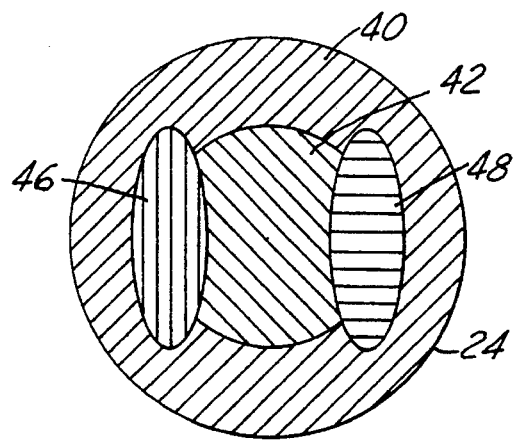
FIGS. 3A and 3B are second and third embodiments of holographic optical elements designed in accordance with this invention.
Figure 3B:
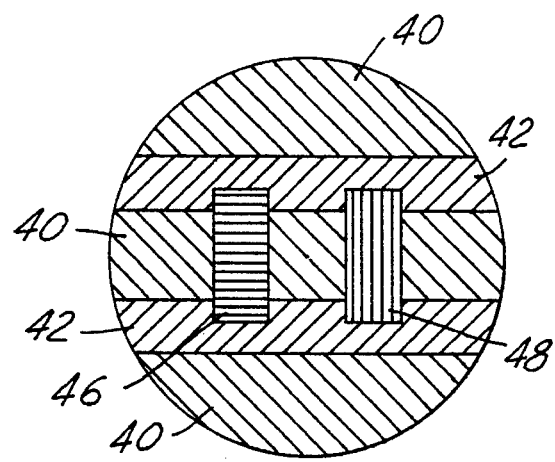

In the illustrated embodiment an additional grating 34 is provided between laser diode 22 and holographic optical element (HOE) 24 to enable the system to perform 3-beam tracking. Alternatively, push-pull tracking can be used. In such an alternative embodiment, HOE 24 is modified to accommodate additional regions used for that purpose. Example of such an embodiment is illustrated in FIGS. 3A and 3B.

Push-pull tracking and 3-beam tracking are two tracking methods that are implemented with the use of gratings, which are well known to those skilled in the art. The particular tracking method used influences the design of the HOE and that is why they are mentioned in this application. A system designed in accordance with this invention is compatible with both of these tracking techniques. Further explanations of these tracking techniques can be found in: (1) Marchant, *Optical Recording*, Addison Wesley, pp. 172–181 (1990); and (2) Ono et al., "Computer-Generated Holographic Optical Elements For Optical Disk Memory Read Write Heads," Society of Photo-Optical Instrumentation Engineers, vol. 1052, pp. 150–157 (1989). The teachings of both of these references are hereby incorporated into this specification.

Pickup head 20 has the various components discussed above arranged about an optical axis 35. Optical axis 36 is generally coincident with the central axis of a light beam that is emitted from laser diode 22.

Significant advantages are provided by this invention by utilizing HOE 24 to implement the focus error detection regions that are otherwise typically performed by a photodetector array. Electronics 38 are coupled to photodetectors 30, 32 and include suitable conventional electronics useful for generating and interpreting electronic signals as will be discussed in more detail below.

Figure 2:
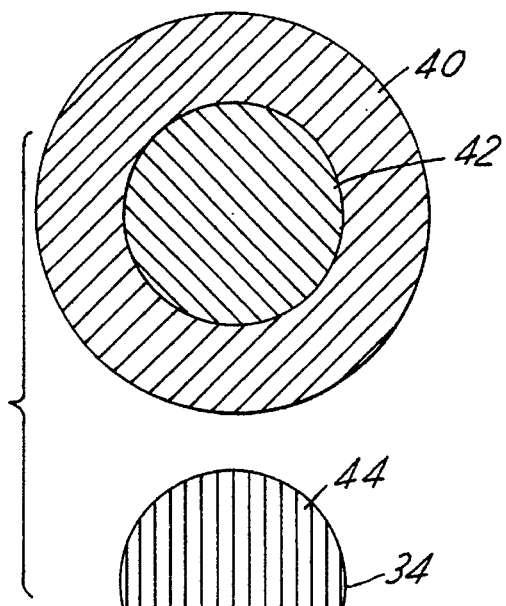
FIG. 2 illustrates a preferred embodiment of a holographic optical element designed in accordance with this invention.

As illustrated in FIG. 2, HOE 24 includes first region 40 and second region 42. The lines in the illustrated HOE represent gratings in a holographic optical element. One skilled in the art will understand how holographic optical elements are produced with such gratings and, therefore, a specific methodology for producing such holographic optical elements will not be discussed further. It should be noted that the gratings of first region 40 and second region 42 will direct light passing through HOE 24 in different directions, respectively. FIG. 2 also illustrates a preferred relative orientation for grating 44, which is incorporated on additional grating 34, that is implemented when 3-beam tracking is to be performed by pickup head 20.

Typical holographic optical elements that are used in optical compact disk pickup heads generally act as a beam-splitter that direct some of the return light onto an array of photodetectors. Typical holographic optical elements also interact with the geometry of photodetectors to create a focusing and tracking error signal, respectively. As mentioned above, strict alignment and tolerance requirements are imposed on typical holographic pickup heads as a specific geometric relationship between the holographic optical element and the array of photodetectors is required.

The holographic optical element 24 of this invention is significantly different from conventional holographic optical elements because HOE 24 is utilized for generating a focus error signal independent of the array of photodetectors. The basic methodology for focus detection that is associated with this invention utilizes a difference in power in two decision regions (i.e., first region 40 and second region 42). The relative power from the two decision regions 40,42 is used to determine whether light emitted by laser diode 22 is properly focused on disk 28.

Prior optical pickup head designs using HOE's in conjunction with focus error detection incorporated the focus error decision boundaries in the photodetector array. By contrast, this invention implements these decision boundaries in the HOE. This invention, therefore, provides a significant advantage in eliminating the critical alignment requirements between HOE's and photodetector arrays mandated by prior pickups. According to this invention, the photodetectors are used to receive light diffracted by the HOE and convert the intensity of that light into an electronic signal. The particular geometry of the photodetectors is arbitrary.

FIGS. 3A and 3B illustrate two more embodiments of HOE 24. In FIG. 3A first region 40 and second region 42 are provided as in FIGS. 1 and 2, namely first region 40 and second region 42 are concentric circles when viewed in a single plane of HOE 24. The embodiment of FIG. 3A also includes third region 46 and fourth region 48, which implement push-pull tracking in a manner known to those skilled in the art. The HOE illustrated in FIG. 3B includes first and second regions 40 and 42 that are strip partitions of HOE 24. Third region 46 and fourth region 48 are rectangular in the embodiment of FIG. 3B.

Figure 4:
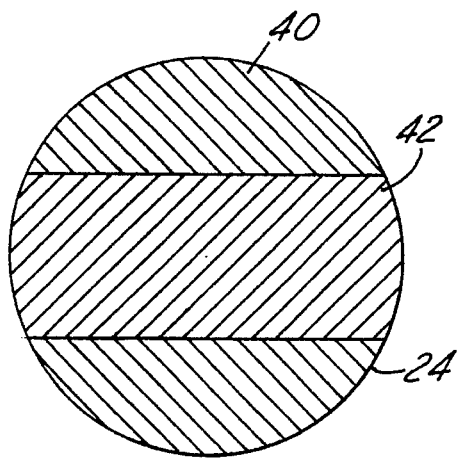
FIG. 4 is a fourth embodiment of a holographic optical element designed in accordance with this invention.
Figure 5:
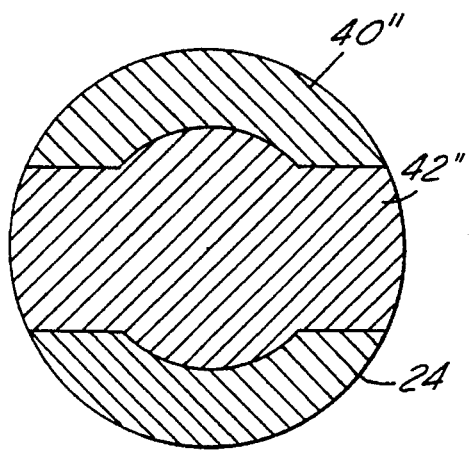
FIG. 5 is a fifth embodiment of a holographic optical element designed in accordance with this invention.

FIGS. 4 and 5 respectively illustrate two further embodiments of HOE 24. The two decision regions have different shapes than those illustrated in FIGS. 1–3B. FIG. 4 illustrates first region 40' and second region 42' while FIG. 5 illustrates first region 40" and second region 42".

Figure 6A:
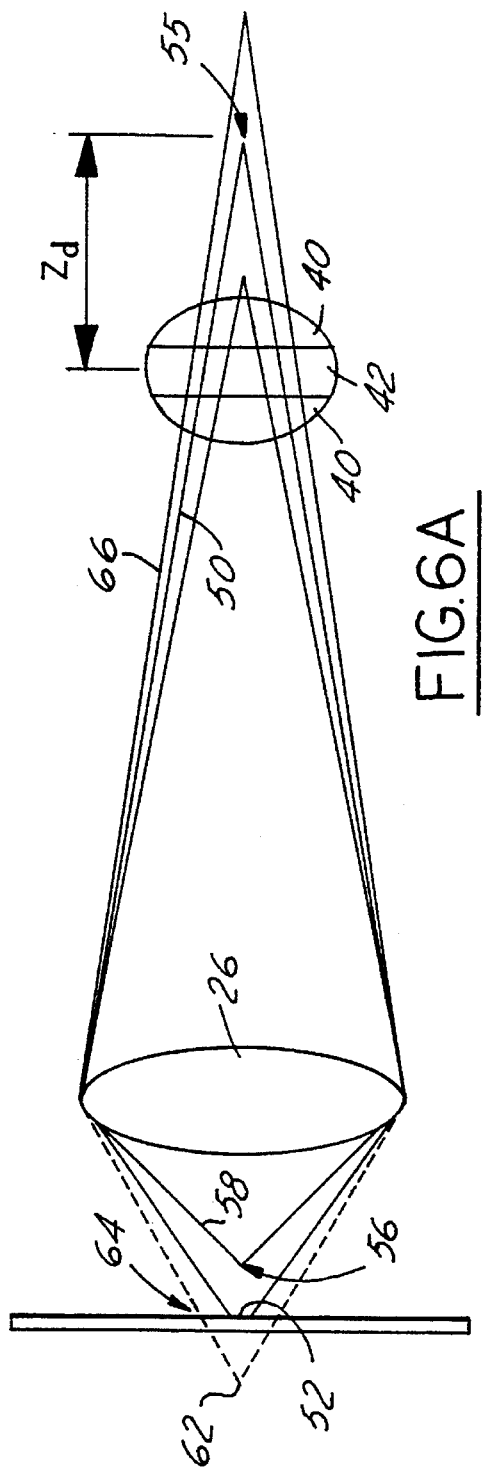
FIGS. 6A through 6D diagrammatically illustrate a focus error detection method associated with this invention.
Figure 6D:
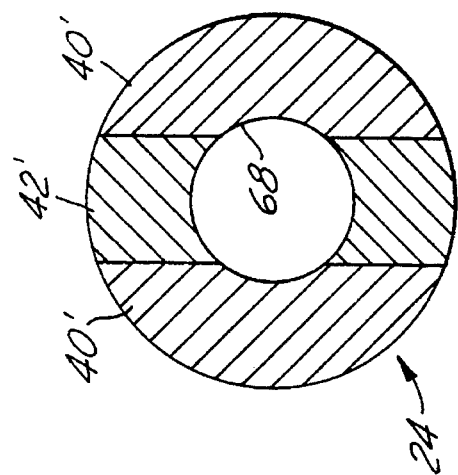
Figure 6C:
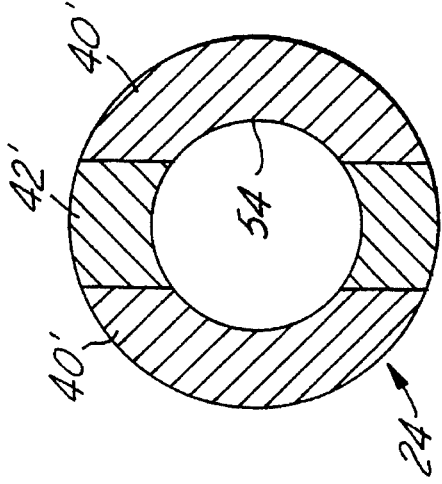
Figure 6B:
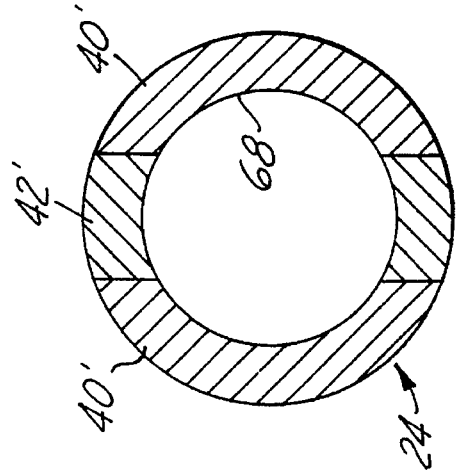

FIGS. 6A through 6D diagrammatically illustrate a methodology associated with this invention for determining whether the laser light incident on disk 28 is properly focused. This type of methodology for producing a signal that indicates the focus or misfocus condition of light on disk 28 is referred to as spot size detection. Light that has been emitted from laser diode 22 is incident upon disk 28 and returns after being reflected from disk 28 along the solid lined light path 50. The point of reflection from disk 28 is indicated at the incident focal point 52, which is on the surface of disk 28. Reflected light 50 encounters holographic optical element 24, which is placed intermediate the disk 28 and laser diode 22 (not specifically shown in FIG. 6A), as illustrated in FIG. 6C by light area circle 54 on HOE 24. Return light 50 encounters HOE 24 before it converges toward a focal point 55 in the conjugate image plane of the disk. HOE 24 is located at a distance $Z_d$ from the focal point in the conjugate image plane. The distance $Z_d$ is indicated in the illustration.

As can be seen in FIG. 6A, when the light from laser diode 22 is focused at a point before the optical disk 28, the incident light is focused at a focal point indicated at 56, which is in a plane parallel to, but in front of, optical disk 28. Focal point 56 is generated when light follows light path 58 (illustrated by the broken lines). The improperly focused light indicated by path 58 is reflected and then incident upon HOE 24 according to the area circle 68 shown in FIG. 6B. As can be seen in the illustrations, circle 68 is greater in circumference than circle 54 shown in FIG. 6C.

When the light from laser diode 22 is focused behind the optical disk 28, a focal point indicated at 62 results. Such light would be incident upon the optical disk 28 generally in a circle indicated at 54. Such light reflects off the optical disk according so light path 66 (illustrated by the dotted lines) and results in area circle 60 when such light encounters HOE 24 as shown in FIG. 6D. As can be appreciated from the illustrations, area circle 60 is smaller in diameter than area circle 54, the latter corresponding to properly focused light on optical disk 28.

The amount of light that encounters holographic optical element 24 is diagrammatically illustrated by the area circles 54, 60 and 68, respectively. As discussed above, each detection region on HOE 24 is a simple holographic grating that diffracts the light incident on each region in a different direction. That is, first region 40' diffracts the light in a different direction than second region 42'. In this general manner, light power from the two detection regions can be detected and interpreted separately. Size of first region 40' and second region 42' are preferably designed and arranged such that, when the light is properly focused on the disk 28, an equal amount of light energy :falls upon each detection region. After the light is diffracted, by encountering HOE 24, the photodetectors 30,32 simply convert the optical power of the light incident upon them into electronic signals.

Therefore, the shape, size or specific position of the photodetector array is not important. The two electronic signals corresponding to the power from each detection region are compared using conventional electronics 38 and the difference between the two signals is used to generate a focus error signal.

In the illustrations, when the amount of light incident on HOE 24 corresponds to circle 54, electronics 38 produces a zero error signal, indicating proper focus. Light spot or circle sizes other than that illustrated in FIG. 6G (i.e., circles 60 or 68) will cause the focus error signal to be positive or negative.

Figure 7:
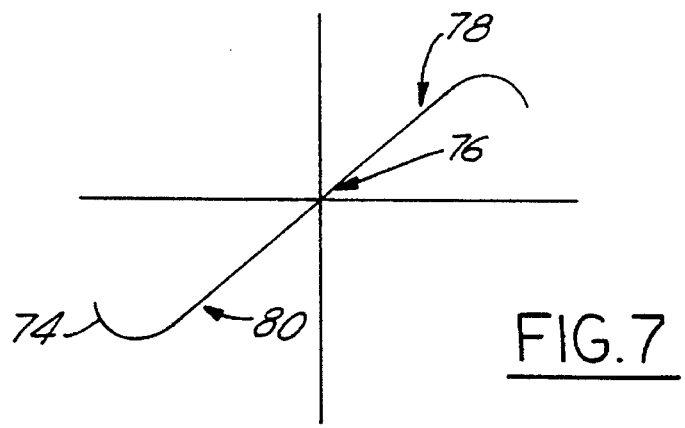
FIG. 7 graphically illustrated a focus error signal as derived in accordance with this invention.

FIG. 7 graphically illustrates a focus error signal generated when the methodology associated with this invention is used. As can be appreciated from FIGS. 6A–6D, when the focus point is offset from the disk surface, the size of the light spot or light area circle at the holographic optical element 24 plane changes. The light area circle becomes smaller as the focus point occurs at greater and greater distances before reflection from the disk. Alternatively, the light area circle at the holographic element plane 24 becomes increasingly larger as the focus point occurs at increasing distances after reflection from the disk.

The focus error signal corresponding to the above scenario is graphically illustrated by curve 74 in FIG. 7. The focus error signal is accurately represented by a smooth curve. When the light is properly focused on the disk, the focus error signal value is zero as indicated at 76 in FIG. 7. The positive portion of curve 74 indicated at 78 corresponds to the focus of the incident light being offset after reflection from the disk (i.e., a focal point such as 62). Alternatively, the negative portion of curve 74 indicated at 80 corresponds to a focus point such as 55, which is before reflection from disk 28.

Figure 8A:
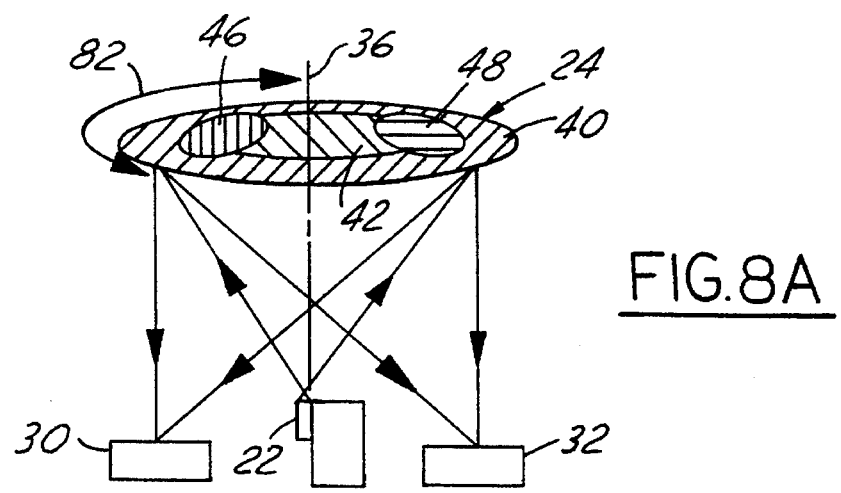
FIGS. 8A and 8B diagrammatically illustrate a method for removing a focus error signal offset associated with this invention.
Figure 8B:
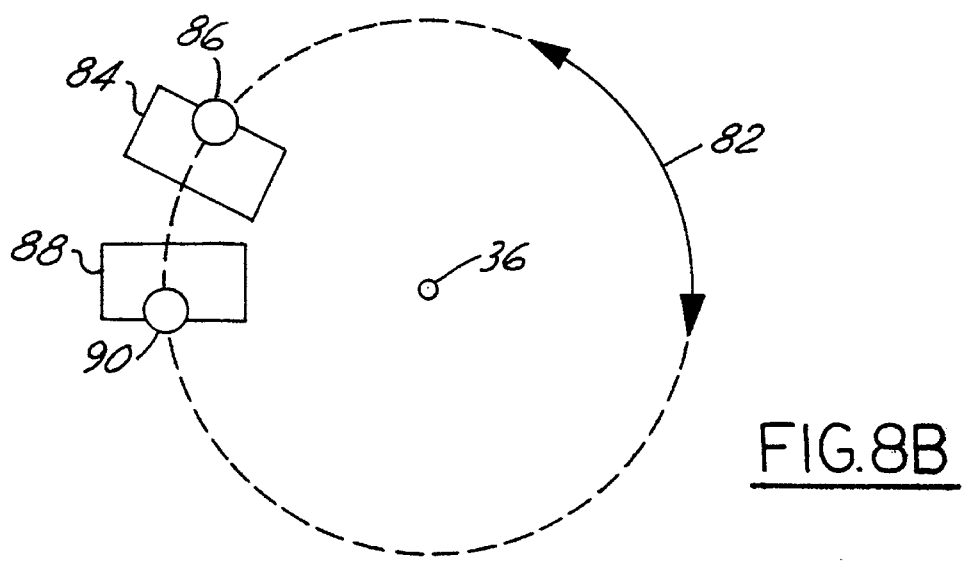

FIGS. 8A and 8B schematically illustrate a methodology associated with this invention to eliminate any offset found in the focus error signal. As diagrammatically shown in FIG. 8A and 8B, holographic optical element 24 is rotated according to a rotation arrow 82 about optical axis 36. Such rotation can be accomplished during the pickup manufacturing process of pickup head 20, for example. Utilizing any of the holographic optical elements discussed above, as the hologram is rotated according to arrow 82 the optical spots in the detector plane resulting from the first hologram region 40 and second region 42 (or 40' and 42' or 40" and 42") rotate about the optical axis 35. As best shown in FIG. 8B, photodetector 84 is adapted to detect light spot 86, which results from the diffraction through second region 42, for purposes of illustration. Similarly, photodetector 88 is adapted and positioned to detect light spot 90, which results from light diffraction through first region 40. Detectors 84 and 88 are preferably positioned such that when HOE 24 is rotated about optical axis 36, one of the light spots begins to rotate off of its corresponding detector while the other light spot remains within its corresponding detector. More specifically, as illustrated in FIG. 8B, when HOE 24 is rotated clockwise (according to the illustration) light spot 86 rotates off of detector 84 while light spot 90 rotates onto detector 88. In this general manner, if there is an offset portion in the focus error signal, this offset can be essentially eliminated by rotating HOE.

Offset portions in the focus error signal can occur due to manufacturing tolerances or a minor misplacement of the holographic optical element along the direction of the optical axis, for example. An offset portion of a focus error signal is indicated when the focus error signal has a nonzero value even though the light is in focus on disk 28. In the general manner just discussed, the methodology associated with this invention provides a relatively simple way to eliminate any offset from the focus error signal caused by a minor misplacement or misalignment of the holographic optical element 24 along optical axis 36.

According to this invention, the arrangement and assembly of the various elements within pickup head 20 is greatly simplified compared to prior devices. According to this invention, light that is diffracted from the different regions of the holographic element need only be intercepted by the photodetectors. The photodetectors need not have a specific geometric interrelationship nor must the photodetectors be placed within very strict tolerances at a specific distance from the holographic optical element. In this invention the photodetectors can be made many times larger than the optical spot such that a distance between holographic optical element 24 and photodetectors 30 can be minimized without affecting the signal quality.

A further advantage associated with this invention is provided that compensates for the normal phenomenon of wavelength change typically found with laser diodes. As a laser heats up or the temperature of its environment changes, the wavelength of the emitted light changes with that change in temperature. Also, the wavelength of light emitted from a laser diode changes as the laser ages. A change in wavelength of emitted light causes a corresponding or resulting change in the angle of diffraction from a holographic optical element. A change in the angle of diffraction from the holographic optical element also changes the position of the light incident on the photodetectors. When detector shape and size is specifically arranged to perform beam measurement, a shift in the beam position can adversely affect the signal quality.

Changes in wavelength do not affect the signal quality in a pickup head designed in accordance with this invention.

According to this invention, beam measurement is effectively performed at the holographic optical element 24 before diffraction and, therefore, the focus error signal is unaffected by laser wavelength change.

Further advantages associated with this invention include increasing the decision region within the light beam used to measure the beam size. In conventional systems, in order to keep the pickup head relatively small, the photodetector array must be located near the return beam focus point (such as 55 in FIG. 6A). The beam diameter is therefore also small and requires a very small region within it to perform the spot size detection. According to this invention, the holographic optical element can be placed at a relatively large distance from the return beam focus plane (as generally illustrated by distance $Z_d$ in FIG. 6A) and the decision regions that measure the beam size are, therefore made relatively large. The larger beam size at the decision region permits a greater tolerance in pickup head design. Greater tolerance results from the phenomenon that any error in alignment between the decision region and the beam degrades the focus error signal less significantly or less rapidly when the decision regions are relatively large.

The following is a basic preferred design procedure for choosing the spot-size detection holographic regions 40 and 42. First, the basic design shapes are chosen. The spot-size detection decision region shapes and a tracking error signal generation technique is chosen. If 3-beam tracking is to be used, no space need be allocated for it on the HOE since it is implemented with a separate grating and the entire HOE is used for focus error decision regions 40 and 42, for example. If push-pull tracking is to be used, the push-pull tracking regions 46 and 48 (see, FIGS. 3A and 3B) are allocated first. The remaining HOE area is used for focus error decision regions 40 and 42. Once the spot-size decision region shapes are chosen, a light profile at the decision surface that corresponds to the spot in focus on the disk is calculated, simulated or measured in a conventional manner. Once this information is obtained, the size of the decision regions are varied until the first region receives the same amount of light power as the second region for the in-focus light profile. Then, using the calculated, simulated or measured light profiles from above, the performance of the pickup head is estimated in order to decide whether the design is acceptable.

Several considerations influence the choice of decision region shapes and whether a particular holographic optical element is acceptable. There are three main tradeoffs to be considered when choosing the design of the focus error decision regions. These three tradeoffs can be summarized as follows. First there is "slope sensitivity vs. $Z_d$ and misalignment tolerance", second there is a "crosstalk vs. decision region shape" tradeoff, lastly, there is a "slope sensitivity vs. shape" tradeoff.

Figure 10:
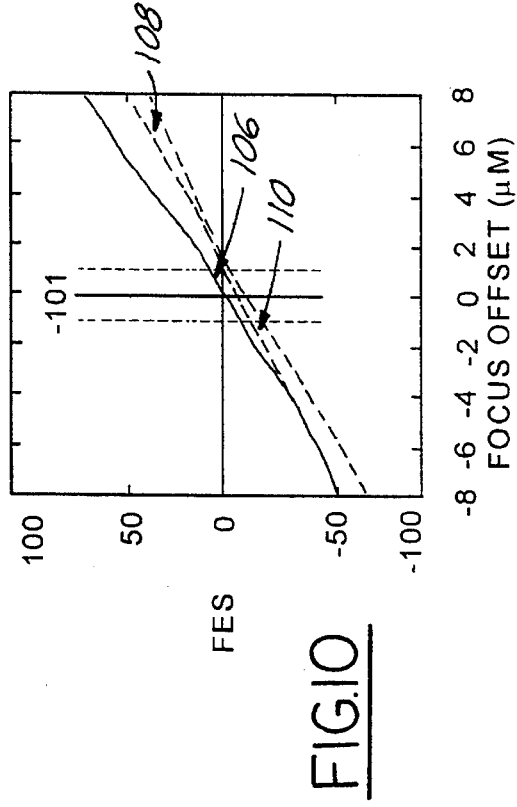
FIGS. 9 and 10 are graphical representations of a focus error signal derived in accordance with this invention compared to a focus offset distance.
Figure 9:
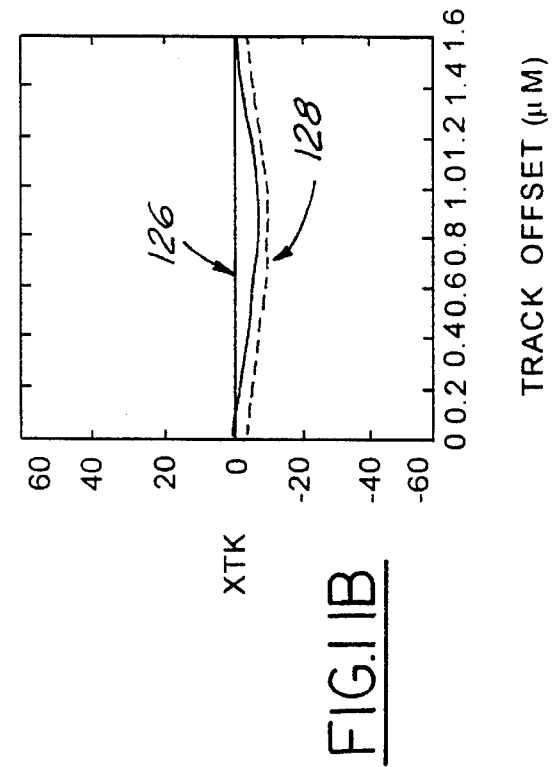

The slope sensitivity vs. $Z_d$ and misalignment tolerance tradeoff is graphically illustrated by referring to FIGS. 9 and 10. FIG. 9 corresponds to a $Z_d$ value of 1.5 millimeters, while FIG. 10 corresponds to a $Z_d$ equal to 4.0 millimeters. Both figures graphically illustrate the focus error signal versus a focus offset (in units of micrometers).

The solid line 100 corresponds to a perfect alignment, the broken line 102 corresponds to a shift in direction perpendicular to the optical axis 36, wherein the illustrated values correspond to a shift at 20 micrometers. The curve illustrated by broken lines at 104 corresponds to the values obtained when there was a shift in the other transverse direction, perpendicular to the optical axis 36 of 20 micrometers. Therefore, a 20 micrometers transverse shift is the maximum that can be tolerated when $Z_d$=1.5 mm, giving a focus offset of 1 micrometer.

In FIG. 10, the curve illustrated at 106 corresponds to a perfect alignment of the holographic optical element 24. The values illustrated in FIG. 10 correspond to a distance $Z_d$ equal to 4.0 millimeters. The broken line curve illustrated at 108 corresponds to a shift in the direction perpendicular to the optical axis 36 at approximately 80 micrometers. The curve illustrated by broken lines at 110 corresponds to the values obtained when there is a shift in direction along optical axis 36 at 100 micrometers. Accordingly, when $Z_d$=4.0 mm, a transverse misalignment of 80 micrometers in one direction and 100 micrometers in the orthogonal direction can be tolerated before a focus offset of 1 micrometer is introduced.

From FIG. 9, it can be seen that for a short distance $Z_d$ (i.e., the distance indicated at 55 in FIG. 6A) of 1.5 mm, the focus error signal varies from essentially −100 to +100 for +/−6 micrometers focused offset range. This is to be compared to the case illustrated in FIG. 10, where $Z_d$ is approximately 4.0 mm. In FIG. 10, the slope has decreased relative to FIG. 9 by a factor of two. At the same time, however, the misalignment tolerance has increased from only 20 micrometers in FIG. 9 to 80–100 micrometers in FIG. 10. Such behavior is true regardless of the specific detector shape. Therefore, by increasing $Z_d$ in accordance with this invention, it is possible to significantly increase the tolerance to misalignment at the cost of decreasing the slope sensitivity.

Figure 11B:
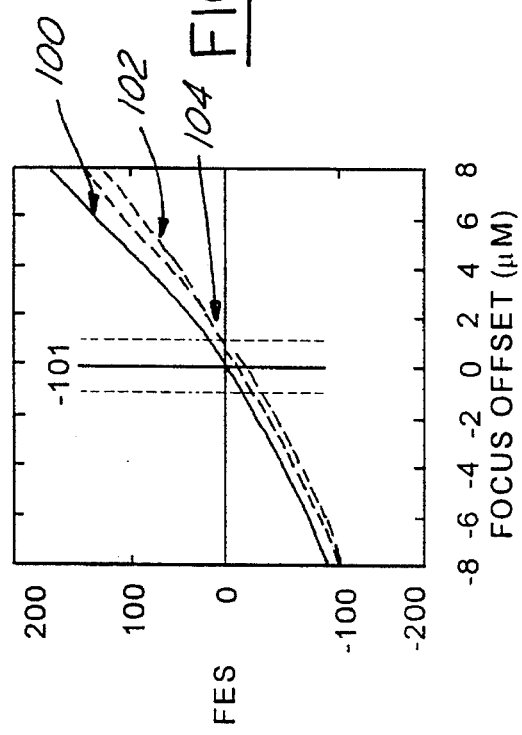
FIGS. 11A and 11B are graphical representations of a cross tracking tolerance associated with this invention compared to a tracking offset distance.
Figure 11A:
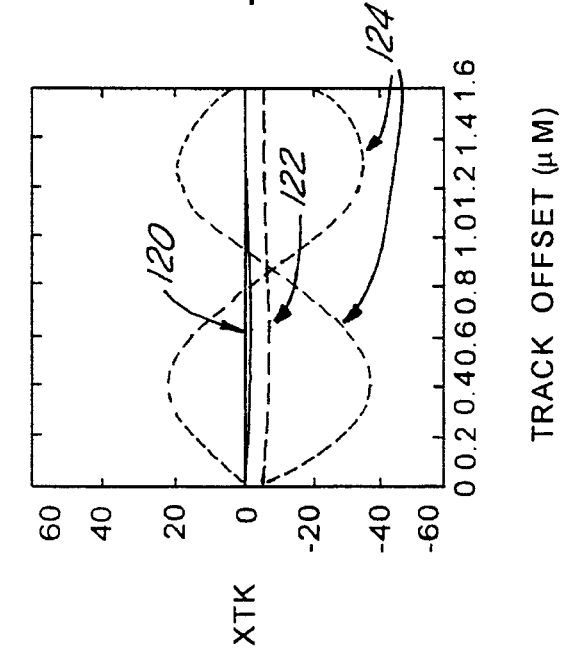

The second tradeoff, that between crosstalk and the decision region shapes, is illustrated by FIGS. 11A and 11B. Crosstalk is an undesirable signal that is present in the focus error signal as the pickup is moved across the tracks. FIG. 11A graphically illustrates crosstalk of a holographic optical element having two circular shaped decision regions like first region 40 and second region 42, as illustrated in FIG. 2, for example. FIG. 11B graphically illustrates the crosstalk for a horizontal striped central region 42' as illustrated in FIG. 4.

In FIG. 11A, the curve illustrated at 120 corresponds to a perfect alignment. The curve illustrated at 122 corresponds to a shift in one transverse direction perpendicular to the optical axis 36 at +/−40 micrometers. The broken line curve illustrated at 124 corresponds to a shift in the other transverse direction perpendicular to optical axis 36 at +/−40 micrometers. In FIG. 11B, the curve illustrated at 126 corresponds to a perfect alignment. Curve 126 is also experienced even though there may be a shift in one transverse direction perpendicular to optical axis 36 at a distance of up to 90 micrometers in a positive or negative direction. The broken line curve illustrated at 128 corresponds to a shift along the other transverse direction perpendicular to the optical axis 36 at +/−40 micrometers from perfect alignment.

As can be seen in FIGS. 11A and 11B, crosstalk is minimal for proper alignment between the decision region and the optical beam. The crosstalk in the case illustrated in FIG. 11A is very sensitive to misalignment along one of the transverse directions perpendicular to optical axis 36. The phenomenon illustrated by FIG. 11A is eliminated when a central decision region 42' is essentially a strip in the direction perpendicular to the optical axis 36. As shown in FIG. 11B, the tolerance to misalignment with respect to crosstalk is increased by this change of shape.

Figure 12:
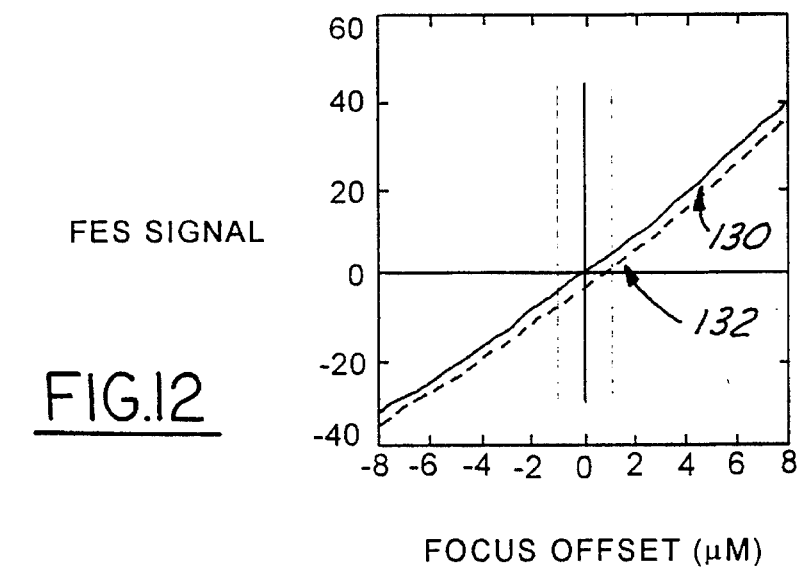
FIG. 12 is a graphical illustration of a focus error signal derived in accordance with this invention compared to a focus offset distance.

Utilizing a stripe or strip for second region 42' improves crosstalk performance, however, it decreases the slope sensitivity. FIG. 12 illustrates a focus error signal curve using the decision regions that minimize the effect of shift on the crosstalk. That is, FIG. 12 corresponds to a plot of focus error signal vs. focus offset if the embodiment of FIG. 4 is implemented. The values plotted in FIG. 12 correspond to $Z_d$ being equal to 4.0 millimeters. The curve illustrated at 130 corresponds to a perfect alignment while the curve illustrated at 132 corresponds to a shift along the optical axis 36 at +/– 40 micrometers. As can be seen from FIG. 12, the slope sensitivity and the tolerance to misalignment in a direction along the optical axis 36 are decreased relative to the circular decision region embodiment of FIG. 2, for example.

The preceding description is exemplary rather than limiting in nature. Variations and modifications will become apparent to those skilled in the art that do not depart from the purview and spirit of this invention. The scope of this invention is to be limited only by the appended claims and all fair legal equivalents thereof.

I claim:

1. A pickup head for use in processing information that is stored on a reflective storage medium, comprising:

a laser for irradiating the storage medium such that radiation originating from said laser reflects from the medium;

a holographic element disposed to encounter the reflected radiation, said holographic element having a decision boundary and at least two decision regions separated by said decision boundary for diffracting the reflected radiation in at least two different directions, said regions having a spatial relationship on said holographic element such that each region receives an equal amount of reflected radiation under preselected conditions;

at least two photodetectors each having only one detecting section for receiving the diffracted radiation from one of said regions and for determining an amount of radiation incident onto each said region.

2. The pickup head of claim 1, wherein said at least two photodetectors further comprise electronics for generating electrical signals indicative of an amount of radiation power incident on each said region, respectively.

3. The pickup head of claim. 2, further comprising means for comparing said electrical signals to thereby determine the relative power incident on each said region.

4. The pickup head of claim 1, wherein said preselected conditions are defined as a condition wherein said radiation emitted from said laser is properly focused on the storage medium.

5. The pickup head of claim 1, wherein said holographic element comprises a holographic lens..

6. The pickup head of claim 1, where said holographic element decision regions are defined by concentric circles on said element when taken in a single plane through said element.

7. The pickup head of claim 1, wherein said holographic element decision regions are defined within a single circle defined in a plane through said element, a first said region being defined within two generally parallel chords taken through said circle and a second said region being defined as that portion of the circle outside said first region but within said circle.

8. The pickup head of claim 1, wherein said holographic element decision regions are defined within a single circle defined in a plane through said element, a first said region being a transverse strip across a portion of said circle and a second said region being a remainder of said circle.

9. The pickup head of claim 1, wherein said holographic element further comprises a third and fourth region, said third and fourth regions diffracting said reflected radiation in third and fourth directions, respectively, said third and fourth directions being different than the directions of diffraction associated with said at least two decision regions.

10. The pickup head of claim 1, wherein said at least two photodetectors are disposed to detect diffracted radiation from at least two decision regions, respectively, said at least two photodetectors being aligned such that rotation of said holographic element about an optical axis associated with said pickup head moves the radiation diffracted from a first region or a second region relative to one of said at least two photodetectors.

11. A holographic element for use in an optical pickup head used to process information on a storage medium, comprising:

a holographic element having a first decision region and a second decision region separated by a decision boundary;

said first decision region having a grating for receiving reflected radiation from said storage medium and diffracting said received radiation in a first direction;

said second decision region having a grating for receiving reflected radiation from said storage medium and diffracting said received radiation in a second direction, different from said first direction;

wherein said first and second decision regions having respective surface areas arranged on said element such that an amount of reflected radiation incident on each said region provides a focus error determination within the pickup head by using two photodetectors each receiving an amount of diffracted radiation from one of said first and second decision regions.

12. The holographic element of claim 11, wherein said first and second decision regions are defined by respective concentric circles.

13. The holographic element of claim 11, wherein said element has a generally circular cross section and said first region is defined between two generally parallel chords taken through said circular cross section and said second region is defined by a portion of said element outside of said chords.

14. The holographic element of claim 11, further comprising a third decision region having a grating for diffracting radiation incident on said element in a third direction and a fourth decision region having a grating for diffracting radiation incident on said element in a fourth direction.

15. A method of determining whether radiation is properly focussed on an optical storage medium, using a single holographic element that has first and second diffraction regions, comprising the steps of:

(A) determining an amount of radiation that reflects from the storage medium and is incident on the first region;

(B) determining an amount of radiation that reflects from the storage medium and is incident on the second region; and (C) comparing the amount of radiation incident on the first region to the amount of radiation incident on the second region to thereby determine whether radiation is properly focussed on the storage medium.

16. The method of claim 15, wherein step (A) is performed by the substep of generating a first electrical signal indicative of the amount of radiation incident on the first region.

17. The method of claim 16, wherein step (B) is performed by the substep of generating a second electrical signal indicative of the amount of radiation incident on the second region.

18. The method of claim 17, wherein step (C) is performed by the substep of comparing the first and second electrical signals.

19. The method of claim 15, further comprising the step of generating a focus error signal indicative of the relative amounts of radiation incident on the first and second regions.

20. The method of claim 19, further comprising the step of eliminating an offset value from the focus error signal by performing the substep of rotating the holographic element about an optical axis such that a focal point of radiation that is diffracted through the first and second regions moves about the optical axis.

* * * * *